United States Patent [19]

Danckwerth

[11] Patent Number: 5,708,747

[45] Date of Patent: Jan. 13, 1998

[54] FIBER-BASED SYSTEM AND METHOD FOR DELIVERY OF PULSED HIGH POWER OPTICAL RADIATION

[75] Inventor: Thomas M. Danckwerth, New Milford, Conn.

[73] Assignee: Hughes Aircraft Company, Los Angeles, Calif.

[21] Appl. No.: 633,246

[22] Filed: Apr. 18, 1996

[51] Int. Cl.$^6$ ........................................ G02B 6/04
[52] U.S. Cl. .................................. 385/115; 385/31
[58] Field of Search ............................ 385/15, 31, 33, 385/38, 39, 115–119, 123, 124, 126, 127

[56] References Cited

U.S. PATENT DOCUMENTS

| | | | |
|---|---|---|---|
| 4,641,912 | 2/1987 | Goldenberg | 385/117 X |
| 4,983,014 | 1/1991 | Nattermann | 385/115 |
| 5,208,699 | 5/1993 | Rockwell et al. | 385/116 X |
| 5,418,882 | 5/1995 | Ortiz, Jr. | 385/124 |

OTHER PUBLICATIONS

R.G. Smith, "Optical Power Handling capacity of Low Loss Optical Fibers as Determined by Stimulated Raman and Brillouin Scattering", *Applied Optics*, vol. 11, No. 11, Nov. 1972, pp. 2489–2494.

Bahaa E. A. Saleh, Malvin Carl Teich, *Fundamentals of Photonics*, John Wiley & Sons, New York, 1991, pp. 298–300 [No Month].

Primary Examiner—John D. Lee
Attorney, Agent, or Firm—W. C. Schubert; W. K. Denson-Low

[57] ABSTRACT

A fiber-based delivery system and method for delivering pulsed high power optical radiation (14) over longer fiber lengths than prior fiber-based systems comprises a fiber bundle (10) and a beam launcher (12) that directs a high power optical beam (14) to an input end (18) of the fiber bundle (10), and distributes it over the individual fibers (22) in the bundle. The number of fibers (22) is large enough so that substantially all of the individual fibers (22) are subjected to an optical intensity level below that required to induce substantial nonlinear optical losses. In addition, the diameters of the individual fiber cores (34) are small enough so that the modal dispersion experienced by the optical beam (14) does not exceed approximately 80 ns/km. In a preferred embodiment for transmission of pulsed 1.06 micron light, the fiber bundle (10) comprises 96 individual fibers (22), with respective core (34) diameters of approximately 600 microns, that are encapsulated in a jacketed adhesive (30). The fibers are preferably spaced from each other in the adhesive (30) such that the cumulative cross-sectional areas of their cores (34) occupy at least 75 percent of the total cross-sectional area of the fiber bundle (10).

13 Claims, 3 Drawing Sheets

FIBER-BASED SYSTEM AND METHOD FOR DELIVERY OF PULSED HIGH POWER OPTICAL RADIATION

BACKGROUND OF THE INVENTION

1. Field of the Invention

This invention relates to optical radiation delivery systems, and more particularly to a fiber-based system and method for delivering pulsed high power optical radiation over long distances with low optical losses.

2. Description of the Related Art

Optical fibers are commonly used, in applications such as laser surgery and industrial material processing, to deliver high power optical radiation to remote locations.

Prior systems utilize single, low loss optical fibers with core diameters that are typically 600 microns or greater. The optical transmission (at the source laser wavelength) capacity of these prior systems is severely limited by nonlinear optical effects that can arise in optical fibers, such as stimulated Raman scattering and stimulated Brillouin scattering. These nonlinear effects, described in R. G. Smith, "Optical Power Handling Capacity of Low Loss Optical Fibers as Determined by Stimulated Raman and Brillouin Scattering", Applied Optics, Vol. 11, No. 11, November 1972, pp. 2489–2494, deplete the optical beam as it propagates through the fiber. The magnitude of the nonlinear effects, and therefore the amount of fundamental optical transmission loss, increases as either the optical intensity or the fiber length is increased.

FIG. 1 is a graph that illustrates the power limitations imposed on prior fiber delivery systems as a result of these nonlinear effects. The graph plots the transmission of 1.06 micron optical pulses as a function of fiber length for a 600 micron core diameter fiber (solid line) and a 2 mm core diameter fiber (dashed line). 40 and 150 millijoule (mJ) optical pulses were transmitted through the 600 micron and 2 mm fibers, respectively. As is illustrated in FIG. 1, significant reductions in optical transmission begin to occur with fiber lengths greater than approximately 15 meters.

In addition to the nonlinear effects described above, modal dispersion causes the optical pulse to spread as it propagates through the fiber, resulting in a reduction in the peak power of the optical pulse.

These problems make prior beam delivery systems inadequate for applications in which pulsed high power optical radiation must be delivered to remote sites that are located more than 15 meters away from the optical source.

SUMMARY OF THE INVENTION

In view of the above problems, the present invention provides a fiber-based delivery system and method for delivering pulsed high energy, high peak power optical radiation over longer fiber lengths than prior fiber-based systems.

This is accomplished by providing a beam launcher that directs a pulsed high power optical beam to an input end of a fiber bundle, and distributes it over the individual fibers in the bundle. The number of fibers in the bundle is large enough that substantially all of the individual fibers are subjected to an optical intensity level below that required to induce substantial nonlinear optical losses. In addition, the diameters of the individual fiber cores are small enough to inhibit significant modal dispersion effects.

In a preferred embodiment for transmission of 1.06 micron light pulses, the fiber bundle comprises 96 individual fibers, with respective core diameters of approximately 600 microns, that are encapsulated in an adhesive material, preferably epoxy. The fibers are preferably spaced from each other in the adhesive material so that the cumulative cross-sectional areas of their usable cores account for at least 75 percent of the total cross-sectional area of the bundle.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
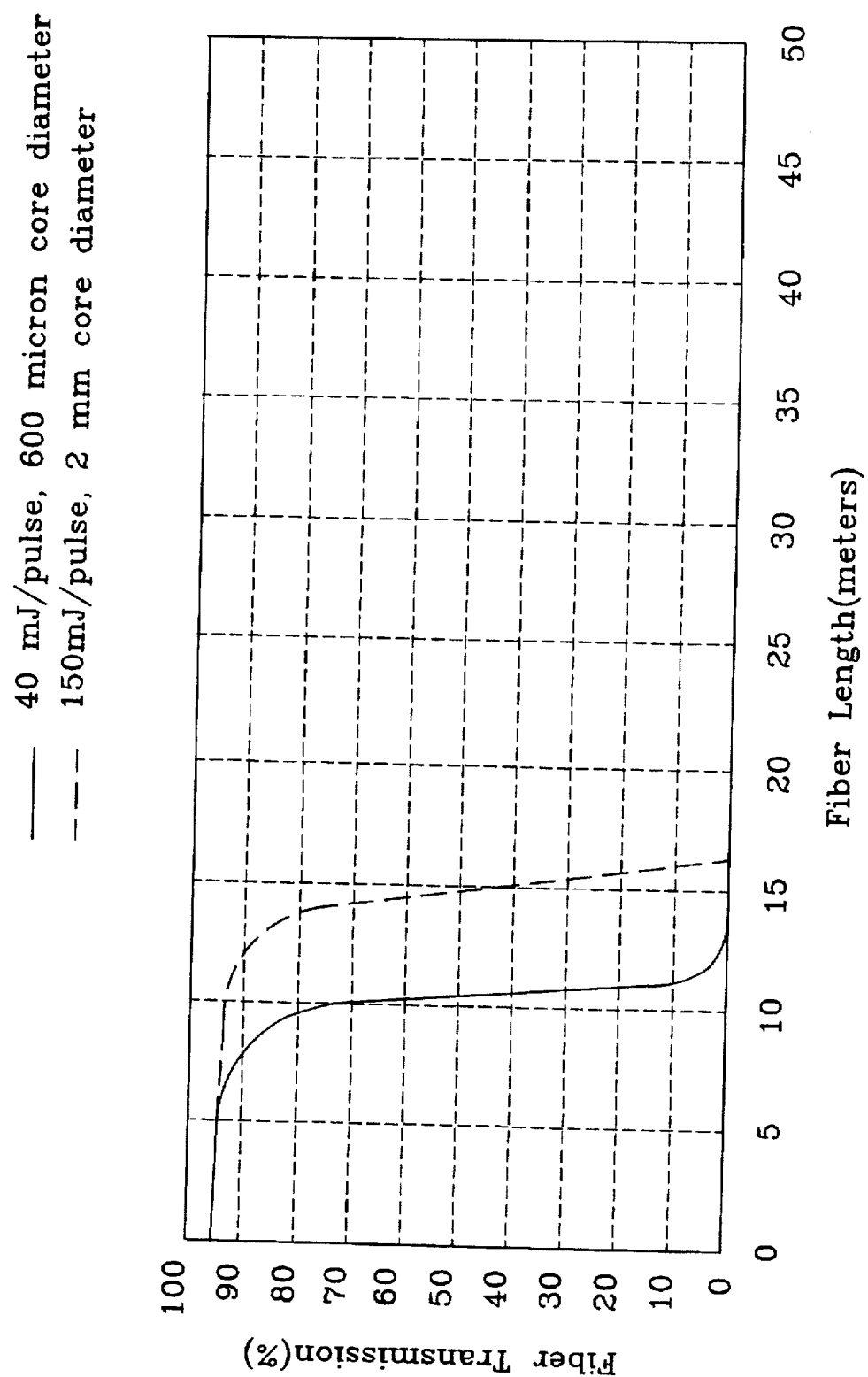
FIG. 1, discussed above, is a graph illustrating the power limitations of prior fiber-based delivery systems.
Figure 2:
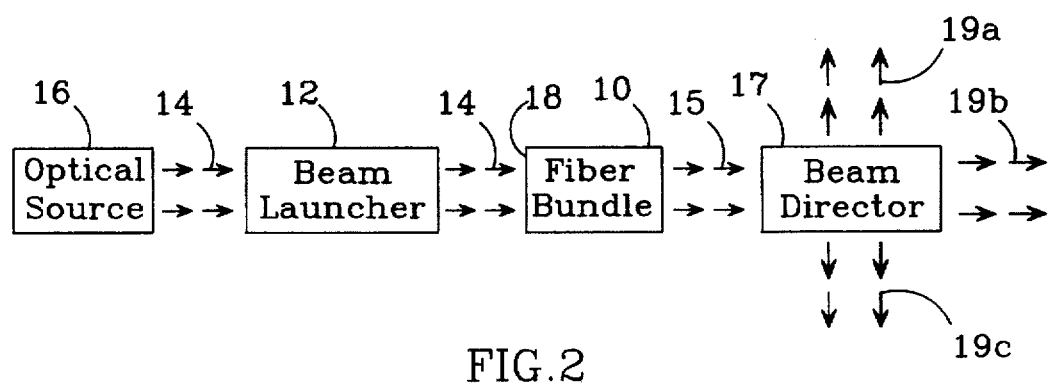
FIG. 2 is a block diagram illustrating the basic principles of the invention.

FIG. 2 illustrates the basic principles of the invention. The fiber-based delivery system comprises a fiber bundle 10 and a beam launcher 12 for directing a pulsed optical beam 14 from an optical source 16 to the input end 18 of the fiber bundle 10, and distributing the beam 14 over all of the fibers in the bundle. The pulsed optical beam 14 has a peak power of at least approximately 10 megawatts. The number of fibers (not shown in FIG. 1) in the bundle 10 is large enough so that substantially all of the fibers are subjected to an optical intensity level below that required to induce substantial nonlinear optical losses. In addition, the diameters of the individual fiber cores are small enough so that the modal dispersion experienced by the optical beam does not significantly degrade its pulsed characteristic; preferably the modal dispersion does not exceed approximately 80 n s/km.

The present beam delivery system can deliver an output beam 15 with a higher total energy and higher peak power than those delivered by prior beam delivery systems. As a result, the present system may be used in applications that call for the delivery of high power optical radiation from a single centralized optical source to multiple remotely located work stations. This is illustrated in FIG. 2, in which the pulsed beam 14 from a single optical source 16 is guided by the fiber bundle 10 to a beam director 17, which splits the single output beam 15 into multiple output beams 19a–19c and directs them to multiple remote work stations (not shown), such as those used in a manufacturing facility for laser welding.

Figure 3:
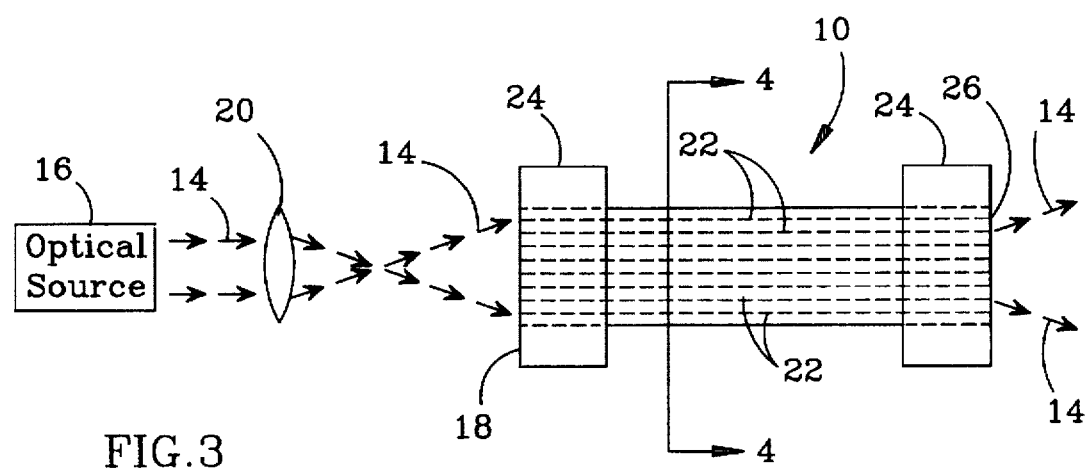
FIG. 3 is a schematic diagram illustrating a preferred embodiment of the invention.

FIG. 3 illustrates a preferred embodiment of the invention. The optical beam 14 from the optical source 16, preferably a laser, is directed to the input end 18 of the fiber bundle 10 with a lens 20, which also expands the beam 14 so that it is distributed over all of the individual fibers 22 in the fiber bundle 10. In the preferred embodiment, standard "sub-miniature Type A" (SMA) fiber connectors 24 are attached to the input end 18 and output end 26 of the fiber bundle 10. SMA fiber connectors, which are available commercially from 3M Corporation, are well known in the art and are used to mechanically attach optical fibers to other optical components (not shown) or to mechanical supports (not shown).

Figure 4:
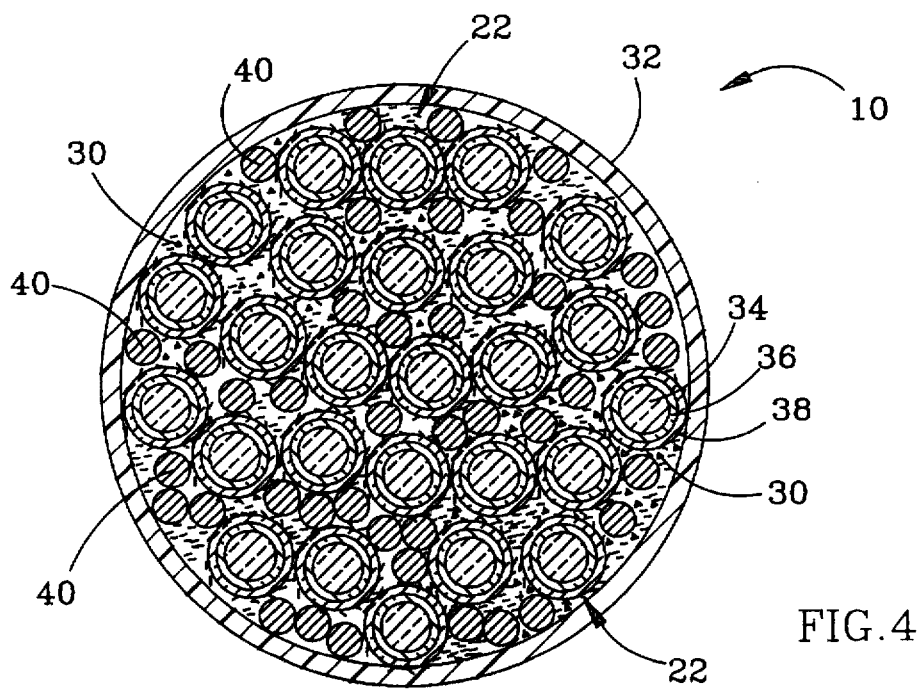
FIG. 4 is a sectional view of the fiber bundle of FIG. 3, taken along the section line 4—4.

FIG. 4 is a sectional view of the fiber bundle 10 taken along the section line 4—4 of FIG. 3. The bundle 10 is made up of a plurality of fibers 22 encapsulated in an adhesive material 30, preferably epoxy. A protective jacket 32, preferably formed from 0.5 to 1 mm thick polyurethane, surrounds the fibers 22 and adhesive material 30. The jacket 32 provides mechanical strength and protects the fiber bundle 10 from outside elements. Each fiber 22 preferably has a core 34 and cladding 36 made of silica, and a buffer layer 38 preferably made of silica. The buffer layer 38 provides mechanical strength to each fiber 22. Strengthening members 40, preferably 0.1 to 1.0 mm diameter steel cables, may be optionally embedded in the adhesive material 30 to provide stiffness to the fiber bundle.

In general, when a pulsed high power optical beam is launched into a fiber, nonlinear optical effects, such as stimulated Raman or Brillouin scattering, can result in a loss of energy from the beam. The magnitude of the nonlinear effects, and therefore the amount of optical loss, is dependent upon the optical intensity in the fiber core, the amount of optical scattering in the fiber core, and the length of the fiber. The present invention distributes the energy in the optical beam over a sufficient number of fibers so that the optical intensity in the individual fibers is kept below a level that would induce substantial nonlinear optical losses.

Specifically, the optical beam (14 in FIG. 3) is expanded and distributed over all of the fibers 22 in the bundle 10, so that each fiber core 34 captures a portion of the beam 14. The number of individual fibers 22 in the fiber bundle 10 are made large enough so that, when the beam 14 is distributed over all the fibers 22, the individual fiber cores 34 are subjected to an optical intensity level below that required to induce substantial nonlinear optical losses.

In addition to the nonlinear effects mentioned above, multimode optical fibers (fibers with core diameters large enough to support multiple modes) exhibit a phenomenon known as modal dispersion. Mode dispersion in optical fibers is well known, and is described in B. E. A. Salech and M. C. Teich, *Fundamentals of Photonics*, John Wiley & Sons, Inc. (1991), pp. 298–300. When an optical pulse enters a multimode fiber, it excites multiple propagation modes in the fiber. Mode dispersion arises as a result of the differences in the propagation velocities of the optical modes that make up the pulse. As the pulse propagates through the fiber, mode dispersion causes it to spread over a time interval $[\frac{1}{2}*(L/v_{min} - L/v_{max})]$, where L is the fiber length, $v_{min}$ is the smallest mode velocity and $v_{max}$ is the largest mode velocity. As the pulse spreads over time, its peak power goes down. As the diameter of the fiber core is increased, the number of modes that it can support (and therefore the amount of mode dispersion and pulse spreading) increases.

In the present invention, each of the fiber cores has a diameter small enough to keep the modal dispersion experienced by its respective portion of the beam from exceeding approximately 80 ns/km. As a result, the present invention is capable of delivering optical pulses with high peak power, while reducing the nonlinear optical effects described above.

This feature is particularly important if the present fiber bundle is used in certain medical applications, such as laser cauterization. In laser cauterization, it is desirable to minimize the thermal diffusion of energy away from the area that is being cauterized. This can be accomplished by utilizing optical pulses with widths that no more than approximately 100 ns. For such an application, the lengths and diameters of the individual fibers that make up the present fiber bundle are chosen so that the width of the optical pulses exiting the bundle do not exceed approximately 100 ns.

It is possible that, after the fiber bundle is designed, some of the fiber cores 34 will be subjected to optical intensity levels that will induce nonlinear optical effects due to random hot spots in the optical beam 14. However, the requirement that substantially all of the fiber cores be subjected to an optical intensity level below that required to induce substantial nonlinear optical losses is satisfied if the non-loss fibers can collectively support a total energy level at least as large as a single larger diameter fiber with a cross-sectional core area equal to the sum of the individual cross-sectional fiber core areas, while supporting a peak power level greater than the hypothetical single larger diameter fiber (due to the higher modal dispersion exhibited by larger diameter fibers, as explained above).

Light that is not captured by the fiber cores 34 is absorbed by the cladding 36, buffer 38 and the adhesive material 30 between the fibers 22. In order to reduce the amount of light absorbed by the adhesive material 30, and therefore improve the optical throughput of the system, the fibers 22 are preferably spaced from each other so that the cumulative cross-sectional areas of their cores 34 account for at least approximately 75 percent of the total cross-sectional area of the fiber bundle 10.

Referring to FIGS. 3 and 4, system parameters will now be given for a system designed to deliver at least approximately 150 mJ of pulsed 1.06 micron wavelength light, with a peak power greater than approximately 10 megawatts, over a distance as large as approximately 1 kilometer (km), with a fiber bundle transmission efficiency of at least approximately 90 percent. For this type of system, 96 fibers 22 are preferably used with core diameters of approximately 600 microns, cladding 36 wall thicknesses of approximately 50 microns, and buffer 38 wall thicknesses of approximately 50 microns. The diameter of the fiber bundle is approximately 1.1 cm (with the protective jacket 32 accounting for 0.1 cm of the 1.1 cm total diameter).

The optical source 16 is preferably a 1.06 micron pulsed laser. The 1.06 micron beam 14 from laser 16 is expanded by lens 20 so that it's diameter is approximately 1.0 cm at the input end 18 of the fiber bundle 10. This distributes the beam 14 over all 96 fibers 22. In the preferred embodiment, a converging lens 20 is used to expand the beam 14 beyond the beam crossover, with the fiber bundle's input end 18 positioned on the diverging side of the lens' focal plane. This reduces spatial variations in the beam's intensity (hot spots) at the input end 18 of the fiber bundle 10.

Figure 5:
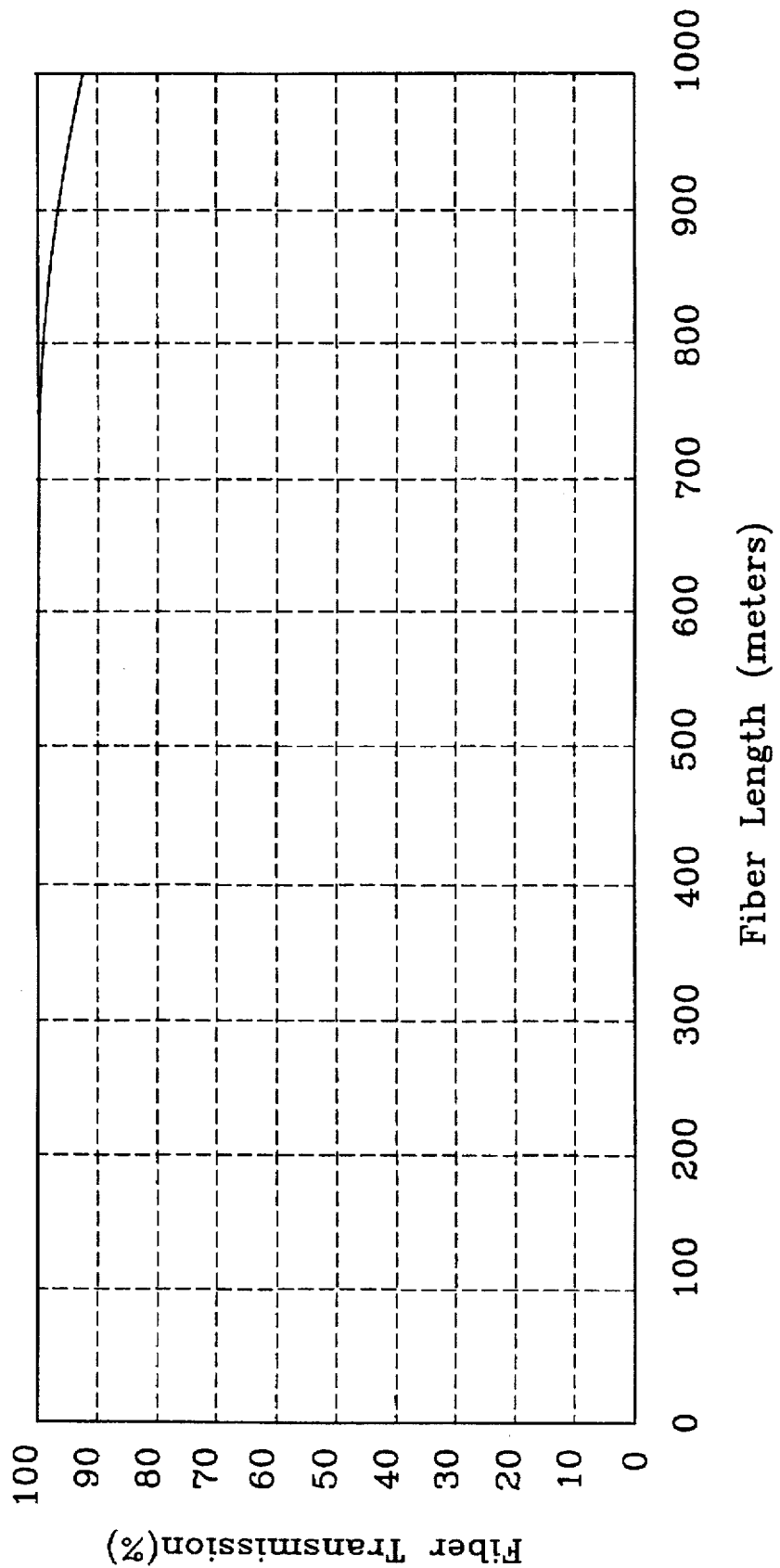
FIG. 5 is a graph illustrating optical transmission as a function of fiber bundle length for an embodiment designed for 1.06 micron light.

The above described system will transmit 150 mJ of pulsed 1.06 micron light over fiber lengths as long as 1 km with nonlinear optical losses of less than approximately 10 percent, as illustrated in the graph of FIG. 5. In addition, the 600 micron individual fiber core diameters keep the modal dispersion from exceeding approximately 80 ns/km, resulting in a peak power reduction of no more than approximately 25 percent.

Numerous variations and alternate embodiments will occur to those skilled in the art without departing from the spirit and scope of the invention. For example, although a system for the delivery of high power 1.06 micron light has been described as an illustrative example, the present invention may be adapted to other wavelengths and input powers.

As discussed above, the nonlinear effects that deplete energy from the optical beam are dependent upon the optical intensity in the fiber core, the scattering cross-section of the fiber core, and the length of the fiber. In designing a system for a particular application, one typically knows the optical energy that will be required at the output end of the fiber bundle, the optical energy available from the optical source, and the length over which the optical energy will have to be guided by the fiber bundle. In addition, the amount of optical scattering exhibited by the fibers that will be used in the fiber bundle is typically available from the manufacturer of the fiber.

Given a known output energy and peak power requirement and the optical energy available from the optical source, the maximum optical loss (optical loss ceiling) that can be tolerated in the fiber bundle 10 is determined. Given the known distance over which the optical energy will be guided by the fiber bundle 10, a threshold optical intensity value that will induce nonlinear optical losses in the fibers 22 that exceed the optical loss ceiling is calculated. Once the threshold optical intensity value is known, the number of fibers 22 in the bundle 10 are chosen to keep the optical intensity in each of the individual fibers 22 below the threshold optical intensity value. In addition, the fiber core diameters are chosen so that the modal dispersion experienced by the optical beam does not exceed approximately 80 ns/km.

Furthermore, although a single converging lens was described as the preferred beam launcher, other types of optics may be used to direct the beam to the input end 18 of the fiber bundle 10 and distribute it over all of the individual fibers 22. For example, an array of converging mini-lenses may be used, with each lens in the array registered to an individual fiber.

Such variations and alternate embodiments are contemplated, and can be made without departing from the spirit and scope of the appended claims.

I claim:

1. A fiber-based delivery system for high power pulsed optical radiation, comprising:

a fiber optic bundle having an input and output end for transmitting a pulsed optical beam with a peak power of at least approximately 10 megawatts over a predetermined distance, said bundle comprising a plurality of fibers with respective fiber cores, and a beam launcher that directs an optical beam to the input end of said fiber bundle, and spatially distributes said beam over said fibers so that each of said fiber cores captures a respective portion of said pulsed optical beam and transmits it to the fiber bundle's output end, each of said fiber cores having a diameter small enough to keep the modal dispersion experienced by its respective beam portion from exceeding approximately 80 ns/km, the number of fibers in said fiber bundle being large enough so that substantially all of the fibers are subjected to an optical intensity level below that required to induce substantial nonlinear optical losses.

2. The system of claim 1, wherein said fiber bundle is more than approximately 15 meters long.

3. The system of claim 2, wherein said optical beam has a wavelength of approximately 1.06 microns, and said plurality of fibers comprise at least 96 fibers with respective core diameters of approximately 600 microns.

4. A fiber-based delivery system for high power optical radiation, comprising:

an optical source for generating a high power pulsed optical beam with a peak power of at least approximately 10 megawatts, a plurality of optical fibers having input and output ends, and respective fiber cores, an adhesive material encapsulating said fibers, a protective jacket surrounding said fibers and adhesive material, said fibers, adhesive material, and protective jacket forming a fiber bundle, and a beam launcher positioned to direct said high power optical beam to the input ends of said fibers, and to distribute said beam over fiber input ends so that each of said fiber cores captures a respective portion of said optical beam and transmits said portion to its respective output end, wherein the diameters of each of said fiber cores are small enough to keep the modal dispersion experienced by its respective beam portion from exceeding approximately 80 ns/km, the number of fibers in said fiber bundle being large enough so that substantially all of the fibers are subjected to an optical intensity level below that required to induce substantial nonlinear optical losses.

5. The system of claim 4, wherein said adhesive comprises epoxy.

6. The system of claim 4, wherein said protective jacket comprises polyurethane.

7. The system of claim 4, further comprising first and second sub-miniature Type A (SMA) connectors attached to the input and output ends of said fiber bundle, respectively, for supporting said fiber bundle.

8. The system of claim 4, wherein said fibers are spaced from each other so that the cumulative cross-sectional areas of their cores occupy at least approximately 75 percent of the total cross-sectional area of said fiber bundle.

9. The system of claim 8, wherein said fibers are longer than approximately 15 meters.

10. The system of claim 9, wherein said plurality of fibers comprise at least 96 fibers with respective core diameters of approximately 600 microns.

11. The system of claim 10, wherein said optical source comprises a laser that generates 1.06 micron optical pulses.

12. A method of guiding and delivering high power optical energy to a remote site, comprising the steps of:

generating a pulsed optical beam having peak power of at least approximately 10 megawatts, and distributing said optical beam over a plurality of optical fibers so that each of said fibers captures a respective portion of said pulsed optical beam and guides it to said remote site, wherein the number of fibers over which said optical beam is distributed is chosen so that the optical intensity in each of said fibers is below a level that will induce substantial nonlinear optical losses, each of said fibers having diameters small enough to keep the modal dispersion experienced by its respective beam portion from exceeding approximately 80 ns/km.

13. The method of claim 12, wherein the number of fibers over which said optical beam is distributed is chosen by:

determining a required optical output energy at said remote site, calculating an optical loss ceiling by comparing said required optical output energy with the optical beam's initial optical energy, calculating a threshold optical intensity value that will induce nonlinear optical losses in said fibers that exceed said optical loss ceiling, choosing the number of fibers over which said optical beam is distributed so that the optical intensity of said optical beam portions in said fibers is less than said threshold optical intensity value.

* * * * *